United States Patent [19]

Sequin et al.

[11] Patent Number: 4,604,752
[45] Date of Patent: Aug. 5, 1986

[54] MAGNETIC STABILIZATION OF HIGH POWER GLOW DISCHARGES

[76] Inventors: Herb J. J. Sequin, 7840 - 44th Avenue, Edmonton, Alberta, Canada, P6K 0Z1; Kyong H. Nam, 11130 - 24A Avenue, Edmonton, Alberta, Canada, T6J 4Y9; Clarence E. Capjack, 5403 143rd Street, Edmonton, Alberta, Canada, T6H 4E4

[21] Appl. No.: 283,181

[22] Filed: Jul. 14, 1981

[51] Int. Cl.[4] .............................................. H01S 3/13
[52] U.S. Cl. ...................................... 372/29; 372/37; 372/85; 372/87; 313/157; 313/161; 313/231.41
[58] Field of Search ................. 372/29, 85, 37, 87, 372/61, 33, 32, 34; 313/157, 161, 231.41

[56] References Cited

U.S. PATENT DOCUMENTS

| 3,509,487 | 4/1970 | Bouwhuis et al. | 372/37 |
| 3,747,015 | 7/1973 | Buczek | 372/37 |
| 3,761,836 | 9/1973 | Pinsley et al. | 372/37 |

OTHER PUBLICATIONS

Sequin et al; "High-Power Laser Discharge Stabilization with Magnetic Field"; Appl. Phys. Lett. 37(2), Jul. 15, 1980.
"Frequency Stabilization of He-Ne Lasers"; Desai et al., *J. Phys. E. Sci. Instrum.*, vol. 12, (1979).
"Short He-Ne Laser at 3.39 $\mu M$ in a Transverse Magnetic Field", Antipov et al., *Opt. Spectrosc.*, vol. 39, No. 5, Nov. 1975.
"Magnetic Stabilization of the Plasma Column in Flowing Molecular Lasers", Buczek et al; Proceed. of the IEEE, vol. 59, No. 4, Apr. 1971.
"Magnetic-Field Control of the Duration of Pulses Emitted from an Iodine Photodissociation Laser"; Belousova et al.; Sov. Jour. Quant. Elect., vol. 7, No. 2, Feb. 1977.
"An Investigation of the Effects of an Axial Magnetic Field on He-Cd Laser", Brown et al.; *IEEE Jour. of Quant. Elect.*
"A Tunable Iodine Laser", Fill et al.; J. Phys. Di. Appl. Phys., vol. 12, May 14, 1979.
"The Effect of Axial Magnetic Field on the Loss Increase of Argon Laser Resonator", Keski et al.; *Elect. Technology*, 11, 3, 1978.
"High Pulse-Rate Glow-Discharge Stabilization by Gas Flow", Dzakowic et al.; *J. Appl. Phys.*, vol. 44, No. 11, Nov. 1973.
"Stabilized $^3$He-$^{20}$Ne Transverse Zeeman Laser", Tsukiji et al., *Applied Optics*, vol. 19, No. 3, Feb. 1, 1980.
"Effect of a Longitudinal Magnetic Field on the Power of a He-Ne Laser"; Gruzinskii et al.; Jour. Appl. Spectrosc., vol. 14, No. 5, May 1971.
"Characteristics of the Stimulated Emission from Iodine Atoms in Pulsed Magnetic Fields", Belousova et al.; *Sov. Jour. Quant. Elect.*, vol. 4, No. 6, Dec. 1974.
"Effect of a Pulsed Longitudinal Magnetic Field on the Generation Intensity of a He-Ne Laser at $\lambda Gen = 1.15\mu$; Gruzinskii et al., *J. Appl. Spectros.*, vol. 16, No. 6 (Jun. 1972), pub. Jul. 1, 1974.

*Primary Examiner*—Leon Scott, Jr.
*Attorney, Agent, or Firm*—Berman, Aisenberg & Platt

[57] ABSTRACT

The invention provides a novel means of stabilizing a glow discharge device against electrothermal instabilities and electrode induced instabilities comprising imposing a magnetic field on the discharge current to create a sheared flow system within the discharge volume. There is further provided an apparatus for producing a stable high power glow discharge comprising an anode and a cathode adapted to be connected to an electric power source and, when so connected, to establish an electric field and a glow discharge between said anode and cathode and an electromagnet adapted to be connected to an electric power source and, when so connected, to establish a magnetic field across said electric field. This application relates to high power glow discharge devices and to a means of stabilizing such devices against electro-thermal instabilities and electrode induced instabilities.

35 Claims, 7 Drawing Figures

MAGNETIC STABILIZATION OF HIGH POWER GLOW DISCHARGES

BACKGROUND OF THE INVENTION

The production of large volume, high pressure, uniform glow discharges, which are stable at high power loading, has been a very difficult problem for a number of years. It has been by far the single most difficult task in E.D.L. (electric discharge laser) research and development. Toward the solution of this problem, considerable effort, both theoretical and experimental, has been expended over the past few years to define and extend the parameters that influence glow-to-arc transitions in a particular laser gas environment. Researchers such as Nighan et al. have shown that the "glow discharge", which is used to pump E.D.L.'s is inherently unstable, particularly in the carbon dioxide and halide systems [W. L. Nighan and W. J. Wiegand, "Instability Onset in Electron Beam Sustained $K_rF$ Laser Discharges", Appl. Phys. Lett. Vol. 32, No. 11, pp 730–733 (1978)]. A critical instability growth time can be ascribed to such discharges which specifies the maximum time duration that a laser discharge can be uniformly maintained to a given volume of gas before the onset of electro-thermal or electro metastable induced glow-to-arc transitions. Specific operational conditions such as gas species, mixture, pressure, power loading and flow velocity are found to have a profound influence on this critical instability formation period. A theoretical upper bound for the maximum power density that can be employed in conventionally stabilized laser discharges can be defined.

Historically, the actaul discharge power densities that could be employed without causing glow-to-arc transitions have fallen far short of the theoretical maximum.

As yet no economically satisfactory solution has been proposed to this difficulty.

PRIOR ART

As indicated above, the prior art provides no economical means of stabilizing a high power glow discharge. An improvement in the performances of devices using glow discharge in the laser context has been realized recently through the use of "plasma conditioning approaches" such as high energy electron beams, ultra-violet radiation and/or multi-element electrode structures. These approaches, however, introduce additional complexity, cost and inefficiency into the laser system, since they only attempt to compensate for but not eliminate the basic instability mechanisms.

To the best of applicant's knowledge there is no cost effective method or means presently available for the stabilization of high power glow discharge against electrothermal instabilities.

SUMMARY OF THE INVENTION

It is an object of the present invention to provide a method and apparatus for stabilization of high power glow discharge against electrothermal instabilities and electrode induced instabilities.

It is a further object to provide a method and apparatus for stabilization of a high power glow discharge laser against electrothermal instabilities and electrode induced instabilities.

It is a still further object to provide a high power glow discharge laser which in operation is stabilized against electrothermal instabilities and electrode induced instabilities.

It is still further object to provide a method and apparatus for utilizing electromagnetic forces to drive a gas flow for recirculation and cooling in a gas laser.

It is a still further object of the invention to improve efficiency in a glow discharge laser.

It is a still further object to provide a high power glow discharge laser comprised of a series of individual laser modules each of which is stabilized in operation against electrothermal instabilities.

Toward the achievement of these objects the invention provides a method of stabilizing a glow discharge device against electrothermal instabilities comprising imposing a magnetic field on the discharge current to create a sheared flow system within the discharge volume.

In a further embodiment of the invention provides a method of operating a glow discharge device comprising establishing a glow discharge between a cathode and an anode, imposing a magnetic field across the discharge electric field and profiling the magnetic field to control the shape and volume of the glow discharge.

In a further embodiment the invention provides apparatus for producing a stable high power glow discharge comprising an anode and a cathode adapted to be connected to an electric power source and, when so connected, to establish an electric field and a glow discharge between said anode and cathode, and an electromagnet adapted to be connected to an electric power source and, when so connected, to establish a magnetic field across said electric field.

GENERAL DESCRIPTION

The invention is based on the discovery that magnetic fields can in their interaction with the discharge current in a glow discharge device be used to stabilize the discharge against glow-to-arc transitions. By using a simple "magnetic electrode" system, an increase of an order of magnitude in the power loading has been achieved over that possible with conventional techniques. This new magnetic stabilization technique has experimentally been demonstrated to be insensitive to gas composition and pressure. Stable high power discharge have also been obtained in electro-negative gases such as $O_2$ and $SF_6$.

According to a principal feature of the invention, glow discharges can be stabilized against a glow-to-arc transition by a sheared particle flow system that is driven by a Lorentz force arising from the interaction of the discharge current with a magnetic field. The technique is applicable to both transverse and axial discharges. In conventional transverse discharges, disturbances in the cathode secondary emission are regeneratively amplified, leading subsequently to the triggering of a glow-to-arc transition. Electron beam and u.v. pre-ionization are to some extent effective in the stabilization of the bulk gas volume, but do little to prevent the onset of an instability within the cathode fall region. The present invention of a magnetically driven sheared flow structure within the ion and electron sheaths near the cathode surface results in uniform and controlled cathode emission, thus preventing electrode generated arcs. The strongly sheared flow that is magnetically driven within the remainder of the discharge volume spreads any localized nonuniformities in density, temperature or current over the entire discharge cross-section, thus preventing the development of self regenerative electrothermal bulk instabilities which would normally lead to the formation of a constricted arc in this region. It is this bulk stability effect which is of importance in the case of axial discharges where the small surface area of the cathode generally avoids cathode instability problems.

A further benefit arising from the invention is in the spatial confinement of the glow discharge. Thus, the Lorentz forces resulting from the interaction of the Hall current with the magnetic field can be used to spatially confine the discharge away from the electrode edges. By using this confining property, it becomes unnecessary to profile the sharp electrode edges.

The velocity structure that is developed within the discharge region will give rise to a spatially nonuniform pressure profile in that region. This will in turn give secondary gas flows that can be employed to recirculate and cool the gas in a laser system.

In the laser context the flow system set up in the discharge region will cause the electrons to undergo at least one and possibly many revolutions of that region in their interelectrode transit. Electrons in this magnetically stabilized discharge region will therefore travel a distance much larger than the interelectrode gap. There is thus an increased probability of interelectron collisions and thus an enhanced utilization of discharge electrons for laser pumping. Laser efficiency will therefore be improved.

BRIEF DESCRIPTION OF THE DRAWINGS

In drawings which illustrate embodiment of the invention.

DESCRIPTION OF THE PREFERRED EMBODIMENTS

Many configurations of the electrodes and the magnetic field can be suggested which would meet the criteria required of the invention. Those described below are preferred but are by no means the only workable embodiments. The essential requirement to obtain the glow discharge stabilization is the presence of crossed magnetic and electric fields.

Figure 1:
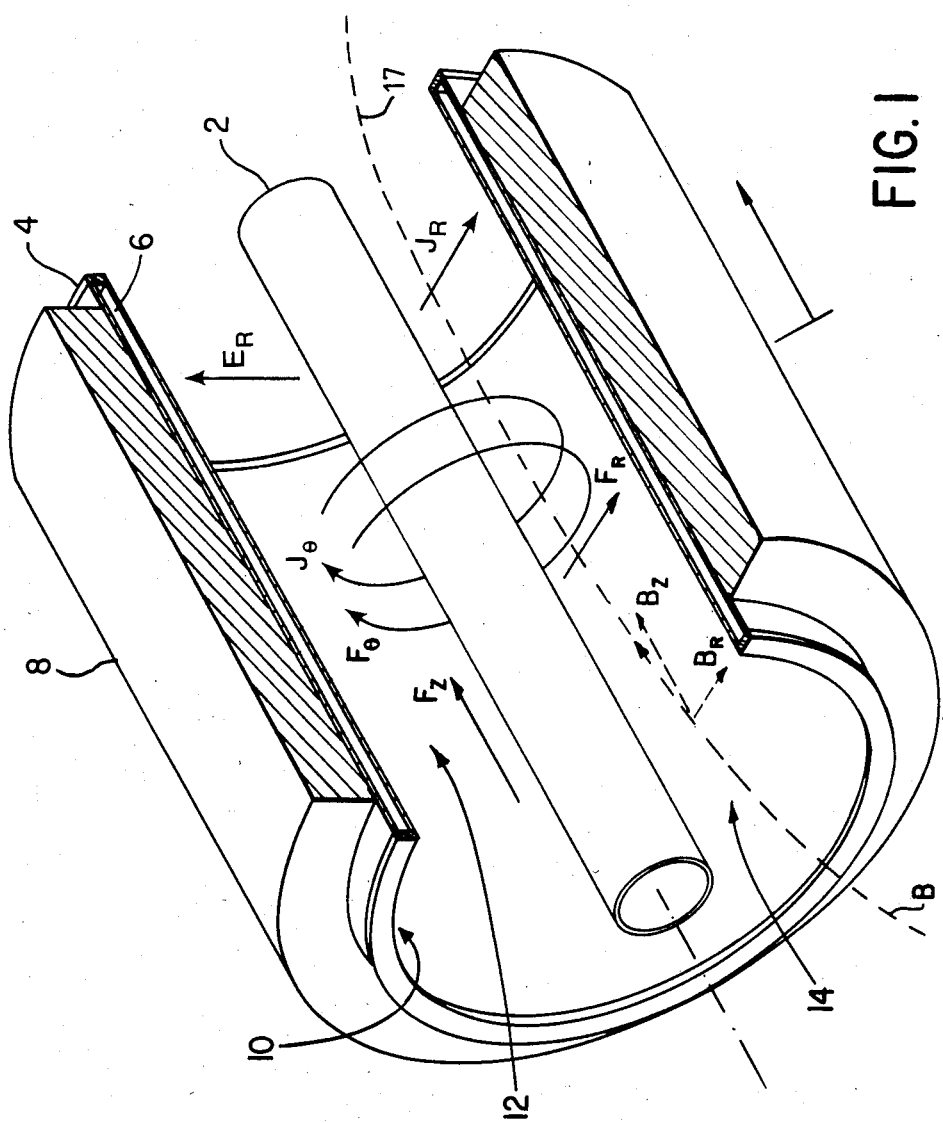
FIG. 1 is a schematic diagram partially cut away of a magnetically stabilized coaxial electrode glow discharge module.
Figure 2:
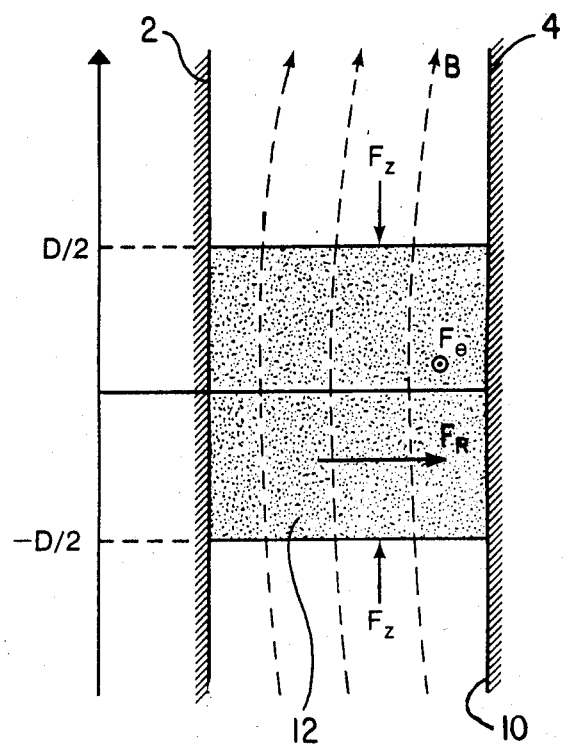
FIG. 2 shows a simplified cross-sectional schematic of the coaxial electrode module of FIG. 1.

With reference to FIGS. 1 and 2, the device illustrated utilizes coaxial cylindrical electrodes to produce a transverse glow discharge. The anode 2 is simply a cylindrical conductive tube through which cooling water can be circulated. The cathode 4 is a double walled cylinder with the enclosed space 6 between the walls again allowing for cooling water circulation. The winding 8 around the cathode outside surface provides the requisite magnetic field.

The imposition of the necessary voltage between the electrodes will set up a radial electric field $E_R$ which will result in a current flow $J_R$ in the radial direction and $J_\theta$ in the azimuthal direction.

Similarly, activation of the winding 8 will set up the magnetic field B having an axial component $B_Z$ and a radial component $B_R$.

The interaction of the radial component $J_R$ of the electric current with the axial component $B_Z$ of the magnetic field will give rise to a Lorentz force $F_\theta$ in the azimuthal direction. This force will result in the charged particles in the discharge region having a velocity component in the azimuthal direction. Collisions of the charged particles with neutral particles then result in a bulk gas rotation in the direction of the charged particles velocity component.

The effects of viscosity will cause this discharge rotational velocity to be strongly sheared in both the radial and axial directions. The sheared rotational velocity of the charged particles within the ion and electron sheaths near the cathode inner surface 10 will prevent the formation of electrode-generated arcs. Any localized temporal or spatial disturbances that do occur in the cathode emission are rapidly dispersed over the region near that surface 10, thus ensuring that uniform and controlled secondary emission is maintained. In conventionally stabilized discharges, disturbances that do occur in the cathode sheath region are regeneratively amplified and consequently lead to the formation of a constricted arc.

The sheared rotational flow that is magnetically driven in the remainder of the discharge volume 12 spreads any localized nonuniformities in density, temperature or current over the discharge cross-section, thus preventing the development of self regenerative-electrothermal instabilities that would normally lead to the formation of a constricted arc.

These electrode sweeping and bulk mixing effects of the forces described are the key factors in stabilizing the transverse discharge. Other important effects are also obtained. The interaction of the azimuthal component $J_\theta$ of the electric current with the radial component $B_R$ of the magnetic field will give rise to a Lorentz force $F_Z$ in the axial direction which will serve to spatially confine the discharge to a region of the device intermediate its ends, as illustrated particularly in FIG. 2. It is this situation that establishes the end of the discharge region that is maintained by the forces $F_Z$. The size and shape of the discharge can be varied and controlled by suitably profiling the strength and shape of the magnetic field.

A further effect arising from electric and magnetic field interaction is that the azimuthal component $J_\theta$ of the electric current and the axial component $B_Z$ of the magnetic field interact to give rise to a Lorentz force $F_R$ in the radial direction. That force combined with the centrifugal force resulting from the discharge rotational velocity will result in a radially increasing pressure profile. Furthermore, the large magnetic and electric field strengths near the cathode shift the maximum in discharge rotational velocity toward the cathode and result in a radial pressure profile in the discharge region. These factors combine in the laser context to establish a bulk gas flow into the discharge region in the area of the anode, from the anode area toward the cathode and out of the discharge region in the area of the cathode. The effect is thus extremely useful in circulating and cooling the gas in a laser system. Finally, as suggested in the summary above, the discharge rotation causes the distance travelled by the discharge electrons in moving from cathode 4 to anode 2 to be greater than the straight line distance from cathode to anode. The electrons may in some cases make many revolutions of the discharge region. The increased distance increases the probability of collisions with the bulk gas and thus improves the pumping effect of that gas. In the laser context this leads directly to increased efficiency.

Figure 3:
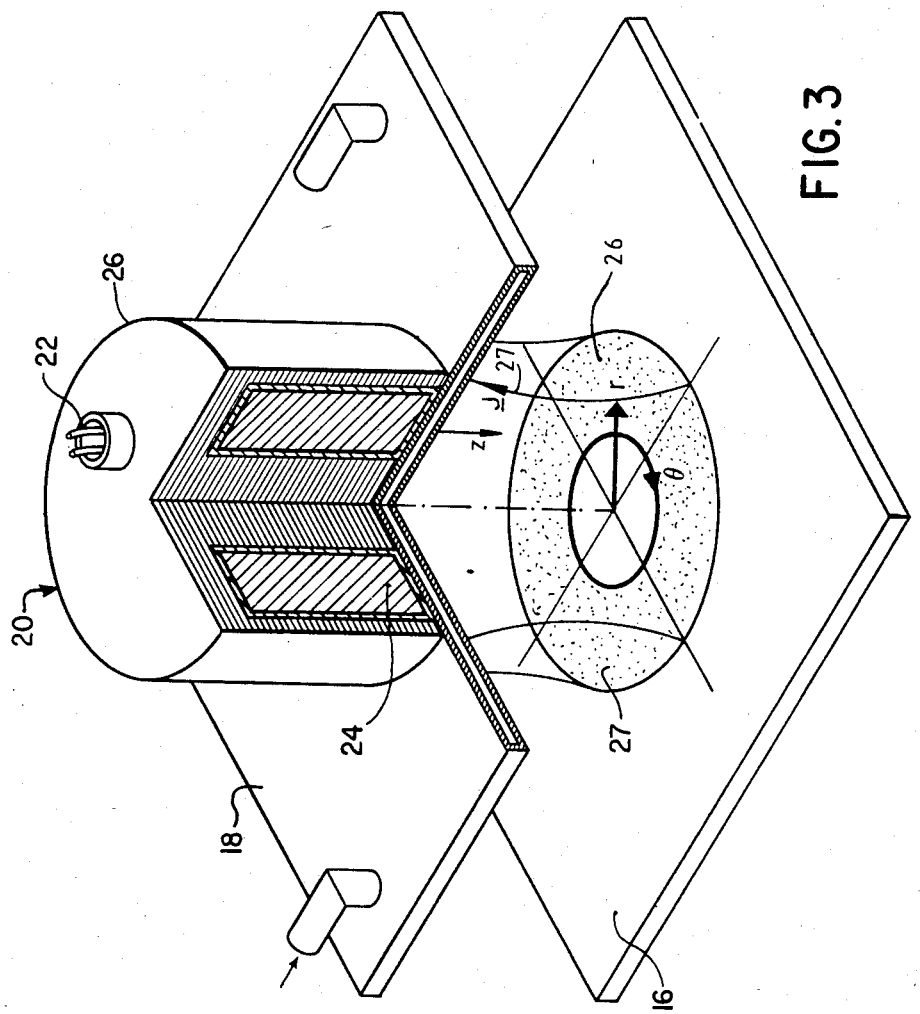
FIG. 3 is a schematic diagram of a magnetically stabilized transverse glow discharge module that uses a simple re-entrant electromagnet.
Figure 4:
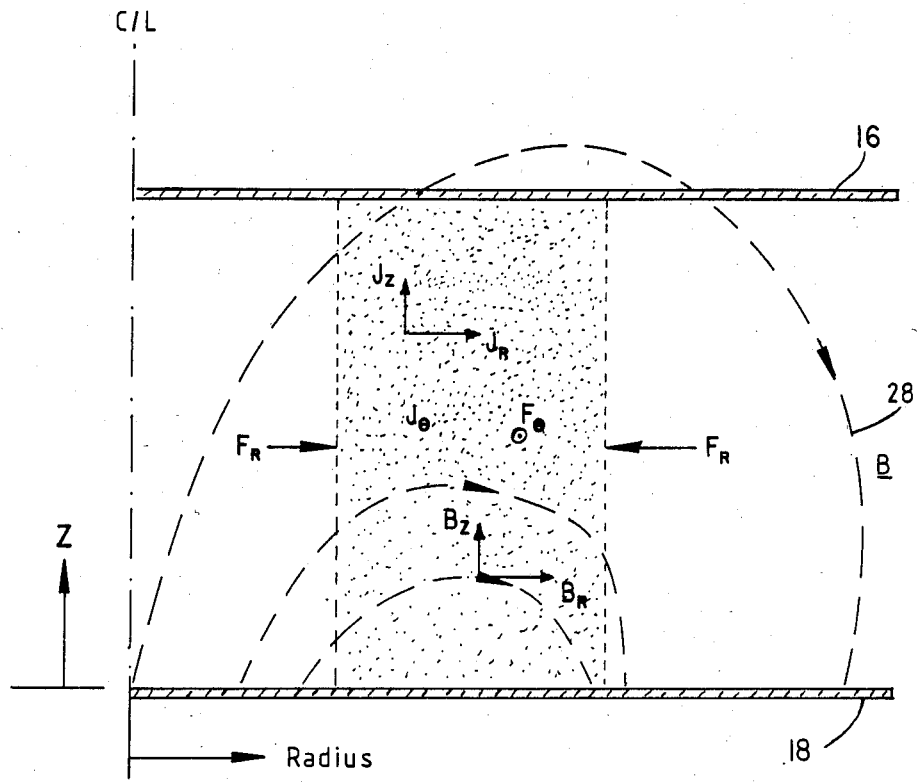
FIG. 4 is a simplified cross-sectional schematic of the re-entrant magnetic discharge module of FIG. 3.

Turning to FIGS. 3 and 4, a glow discharge device is illustrated in which transverse electrodes are utilized to produce the discharge and a re-entrant electromagnet supplies the requisite magnetic field.

The device comprises a hollow plate anode 16 and cathode 18 each of which is double walled to allow cooling water circulation.

The magnet 20 comprises a DC power source 22, the magnetic coil 24 and the electromagnetic yoke 26.

The imposition of a voltage across the electrodes sets up an electric field having, in a cylindrical coordinate system, azimuthal, radial and axial current components $J_\theta$, $J_R$ and $J_Z$ respectively. Similarly, the magnetic field set up by activation of magnet 20 includes radial and axial components $B_R$ and $B_Z$ respectively.

In this case the radial magnetic field component $B_R$ and the axial current component $J_Z$ interact to yield the azimuthal Lorentz force $F_\theta$. Force $F_\theta$ in turn causes rotation of the charged particles which through collisions cause overall rotation of the bulk gas, with similar resulting effects as arose in the FIGS. 1 and 2 case.

In the FIGS. 3 and 4 case the bulk gas rotation provides the same stabilizing effect through electrode sweeping and bulk gas mixing, as well as the improved utilization of electrons to increase efficiency in the laser case.

The secondary radial and axial flows which are particularly useful in recirculating and cooling the gas in a laser system also arise in the transverse electrode case. Due to the large magnetic and electric field strengths near the cathode 18, the maximum in the discharge rotational velocity will be shifted toward the cathode 18 and will result in an axial pressure differential along the discharge volume. The centrifugal effects from the rotating discharge will give a pressure differential radially across the discharge column. These differentials will drive the secondary radial and axial flows. In the laser context the discharge gas will thus be drawn into the discharge volume in the area of the anode and spun outwardly with increasing force as it moves toward the cathode. This effect can then be used as the mechanism for recirculating and cooling the gas in a laser system.

In the transverse electrode case the azimuthal current component $J_\theta$ interacts with the axial component $B_Z$ of the magnetic field to give rise to the radial Lorentz forces $F_R$ which spatially confine the discharge to the annular configuration illustrated at 27.

In the case of both the FIGS. 1 and 2 and the FIGS. 3 and 4 configurations, the discharge volume can be adjusted by adjustment of the magnetic field profile and strength.

Figure 5:
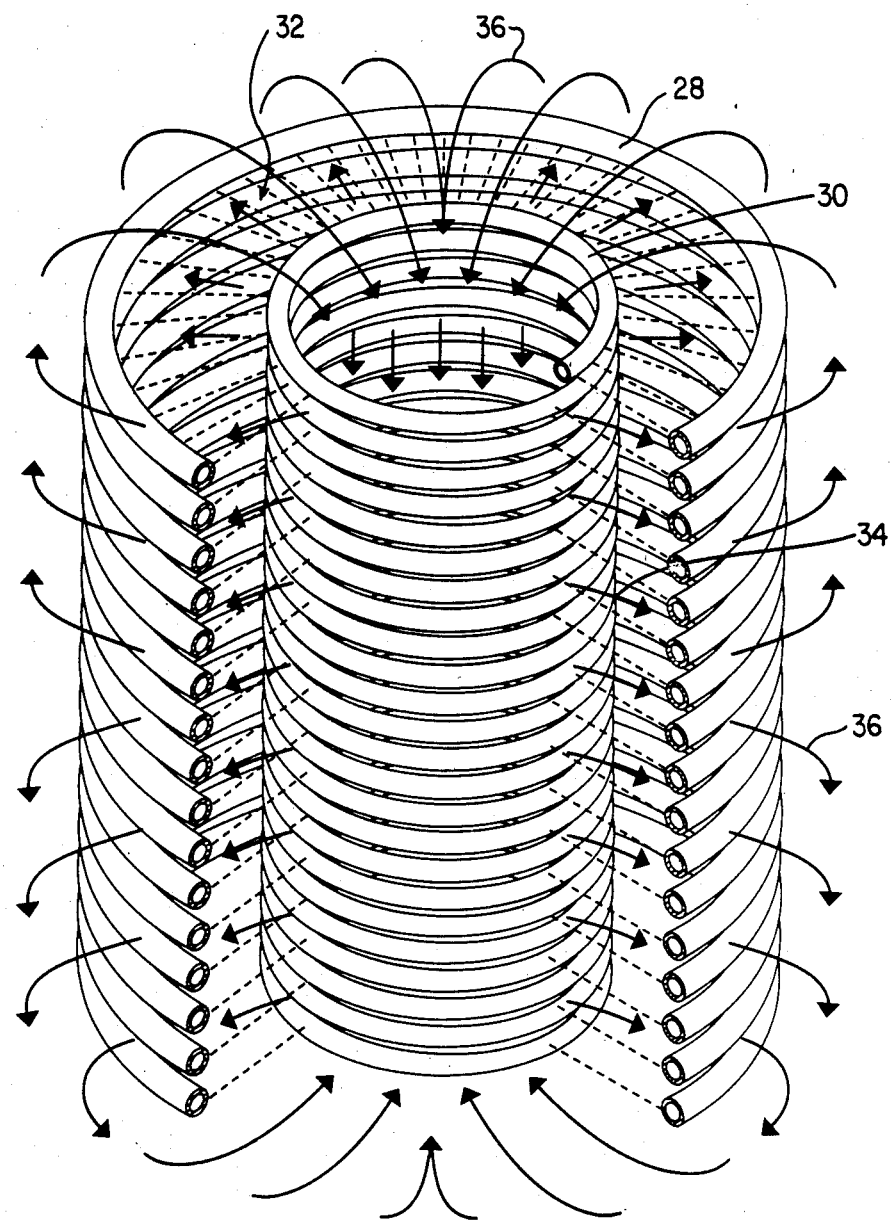
FIG. 5 is a schematic diagram of a modified flow-through coaxial electrode magnetically stabilized glow discharge system utilizing high current single layer solenoids to provide both the electrode surface area and the required magnetic field.

With reference now to FIG. 5, an embodiment is illustrated that is an adaptation of the coaxial electrode configuration of FIG. 1. In this case the electromagnet structure has been replaced by a high current single layer coil 28 which also serves as the cathode. Similarly the coaxial coil 30 serves as anode. Both coils are water-cooled.

This configuration offers a number of advantages. The devices are light and compact. In addition, the coil spacing allows for a very beneficial "electrode flow through" effect by which the magnetically stirred discharge gas is more rapidly recirculated into and out of the discharge region. This magnetically induced tranverse gas transport concept provides for a very high rate of active volume exchange with concomitant lowering of the working gas temperature. This is of prime importance in the laser context.

Thus, in FIG. 5 an outer copper coil 28 serves as the cathode electrode and also provides the necessary cathode magnetic field, while a similar inner coil 30 functions as the anode. An annular discharge volume 32 fills the entire inter-electrode volume. The magnetically induced radial gas flow is illustrated by the arrows 34. Recirculating cool gas exchange is illustrated by the arrows 36. Thus in operation the rapidly rotating inter-electrode plasma causes the gas volume to undergo high velocity gas recirculation and cooling.

All of the effects of the sheared flow system described above are also present in the FIG. 5 case.

Figure 6:
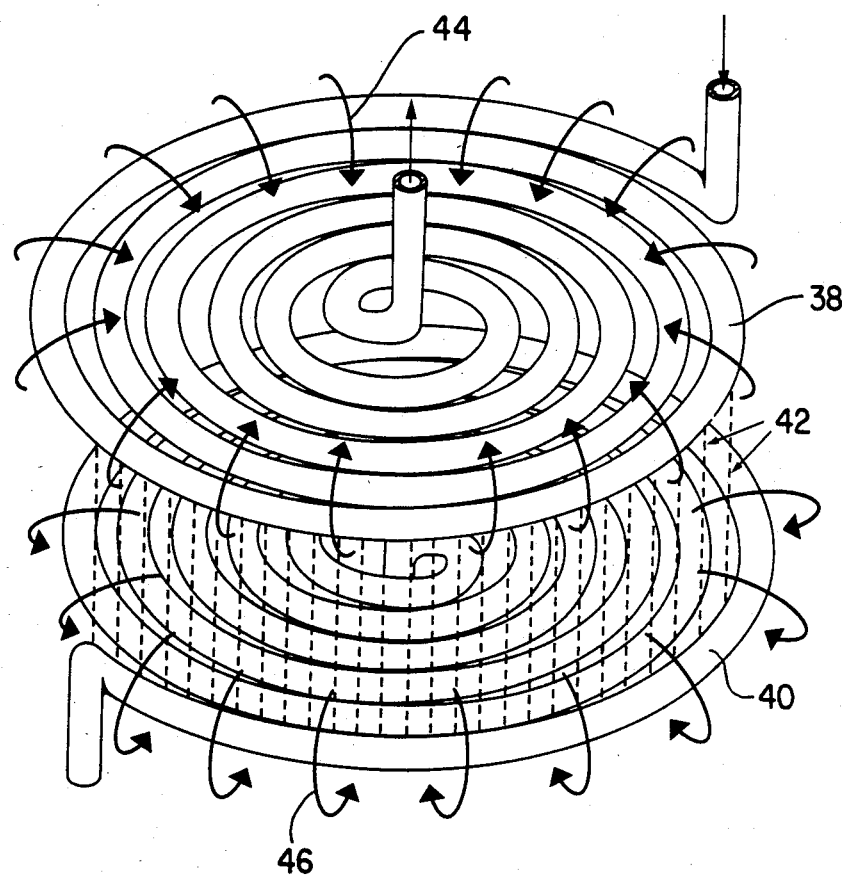
FIG. 6 is a schematic diagram of a modified flow-through magnetically stabilized transverse electrode glow discharge system utilizing high current pancake type single layer windings which provide both the electrode surfaces and the required magnetic field.

With reference to FIG. 6, an embodiment is illustrated which incorporates the "electrode flow through" concept of FIG. 5 in a transerve electrode configuration of the type of FIG. 3. Here the flat coils 38 and 40 serve respectively as cathode and anode and provide the necessary magnetic field. The transverse discharge region is represented by the discontinuous lines 42, and the circulating gas flow by the arrows 44 and 46.

The FIG. 6 embodiment thus offers the same overall advantages as FIG. 5.

Figure 7:
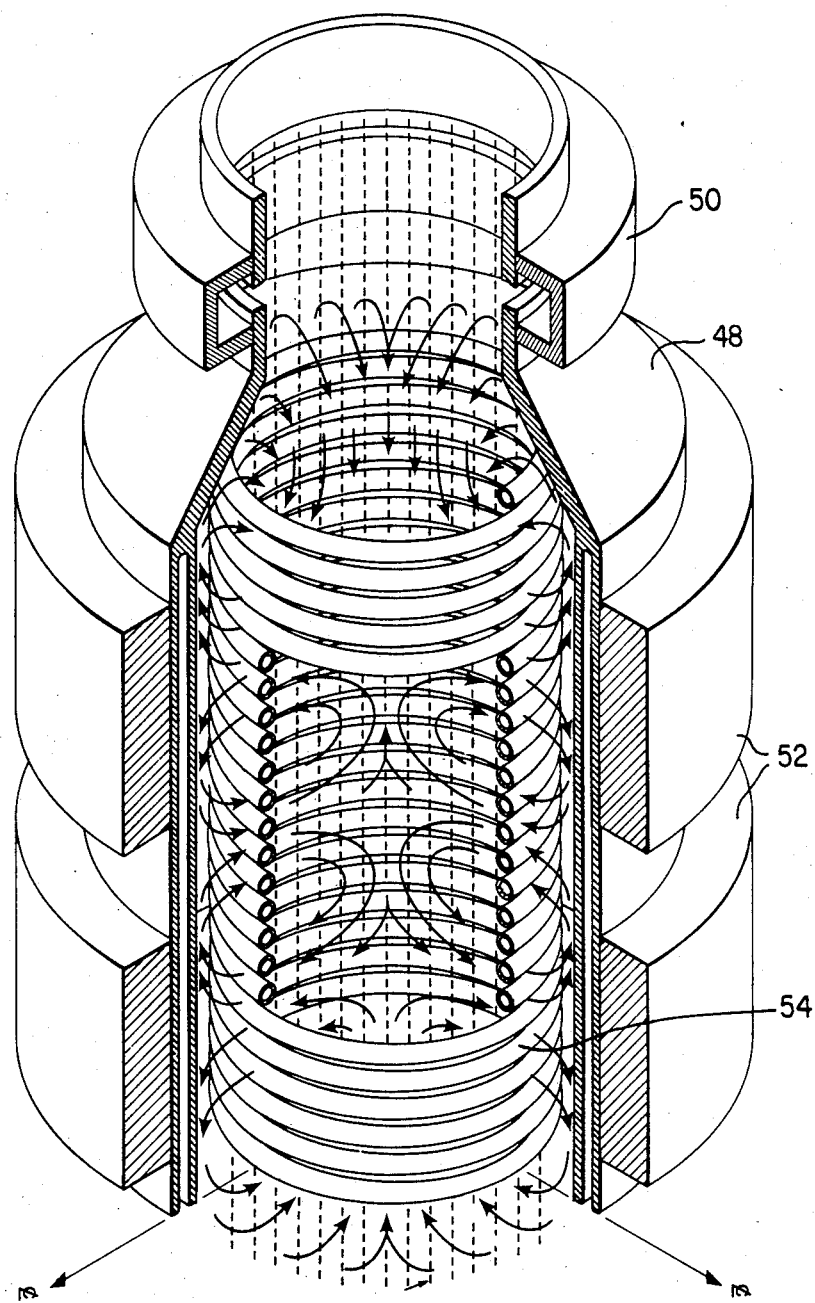
FIG. 7 is a schematic diagram of a magnetically stabilized axial electrode glow discharge structure utilizing a rotating 3-phase AC magnetic field for large volume plasma production and rapid gas recirculation and cooling.

FIG. 7 illustrates another embodiment of this magnetic stabilization and mixing concept. Here a 3 phase AC magnetic field winding encompasses an axial discharge device such that the rapidly rotating AC magnetic vector interacts with the central discharge column. Here, again, Lorentz $J \times B$ forces are seen to cause the axial discharge region to spin at synchronous speed. The result of this induced plasma rotation is to create a uniform large volume central plasma which undergoes very rapid recirculation and cooling gas exchange. The net effect is that a high power axial discharge laser device can be achieved in a relatively short and compact geometry; but more important the device does not require the massive gas pumping facilities required for present day high powered axial discharge lasers.

One half of such an axial laser discharge structure is shown in the sectional isometric of FIG. 7. The device is assumed to possess axial symmetry about the centerlines c. The device includes a water-cooled containment vessel 48 preferably of glass having an electrode ring 50 at each end thereof. In the preferred case the electrode ring is also water cooled. The ring diameter is somewhat smaller than that of main part of container 48. Around the outside of vessel 48 are located the 3 phase AC magnet windings 52. Within vessel 48 is the water cooled coil 54 which has an inside diameter similar to that of the electrode rings and defines the longitudinal discharge chamber. As above, the coil 54 consists of spaced windings and so allows for radial gas flow out of the discharge region. In this configuration cooling is provided not only by the coil 54 but also by the outer jacket 48.

In the axial discharge situation, where the electrode surface areas are very small, electrothermal instabilities in the cathode area are not a problem. In this situation, therefore, it is the bulk mixing effect which is of importance.

In terms of the improvement in performance of glow discharge devices stabilized by the technique of the present invention, the limits have not been established and will depend on the particular configurations of device used. The following results are given for illustrative purposes only and in no way constitute limits on the invention.

To date glow discharge laser systems have been constructed and operated according to the invention having discharge volumes measured in tens of liters. Power loadings of greater than 40 kilowatts per liter and gas velocities in the order of 1000 meters per second have been realized. This compares with pre-invention values in the order of ½ kilowatt per liter and 50 meters per second. The latter figure was only reached conventionally by use of massive motor driven gas circulation blowers which are, of course, very expensive and inefficient to operate.

The magnetic field strength required depends on a number of factors in the particular configuration utilized. Most important among these is the physical closeness to the electrodes. Thus in the case where the electrodes operate as well to set up the magnetic field, the field strength required is much lower. The range utilized to date is in the order of 100 to 1000 Gauss. Computer programs are available which will specify the magnet configuration required to yield a given magnetic field profile. The size and shape of the discharge can thus be readily controlled.

Thus it is apparent that there has been provided in accordance with the invention a high power glow discharge device and means of stabilizing such device against electro-thermal instabilities that fully satisifies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

What I claim as my invention:

1. For use in a glow discharge device including a discharge volume containing charged and neutral particles and a discharge electric field across the discharge volume said field having a discharge current, a method of stabilizing the said device against electrothermal instabilities and electrode induced instabilities comprising imposing a profiled magnetic field on the discharge current so as to create a sheared flow system comprising the charged and neutral particles within the discharge volume.

2. The method of claim 1 wherein the discharge electric field is set up between a cathode and an anode and wherein said profiled magnetic field has components in the same direction as and transverse to the direction of the discharge field.

3. The method of claim 1 wherein the discharge current and said profiled magnetic field may be defined by a common set of cylindrical coordinates and wherein the discharge current has radial, axial and azimuthal components and said profiled magnetic field has radial and axial components.

4. The method of claim 3 wherein the strengths of the radial and axial components of said profiled magnetic field are individually controlled to spatially confine the discharge volume.

5. The method of claim 1 wherein said profiled magnetic field spatially confines the discharge volume.

6. A method of operating a glow discharge device comprising:
   establishing a glow discharge between a cathode and an anode;
   imposing a magnetic field across the discharge electric field; and
   profiling the magnetic field to control the shape and volume of the glow discharge.

7. An apparatus for producing a stable high power glow discharge comprising:
   an anode and a cathode having means for connection to an electric power source and, which, when connected to said source, establish an electric field and a glow discharge between said anode and cathode; and
   an electromagnet having means for connection to an electric power source, and which, when connected to said source, establishes a profiled magnetic field across said electric field.

8. The apparatus of claim 7 wherein the electromagnet to produces a magnetic field having components in the same direction as and orthogonal to the electric field.

9. The apparatus of claim 7 wherein the electromagnet is chosen to provide a magnetic field profile which will adjust the glow discharge to the desired size and shape.

10. The apparatus of claim 7 wherein the cathode is a hollow cylinder having an exterior surface, the anode is a coaxial hollow cylinder within and approximately the same length as the cathode, and the electromagnet is a coaxial hollow cylinder covering at least a major part of the exterior surface of the cathode.

11. The apparatus of claim 10 wherein each of the anode and cathode is of double walled construction and is adapted to receive a flow of cooling water between said double walls.

12. The apparatus of claim 11 wherein the distance between the anode and the cathode is on the order of at least a few inches.

13. The apparatus of claim 12 wherein the cathode and anode are of double walled construction and are adapted to receive a flow of cooling water between said double walls.

14. The apparatus of claim 7 wherein the cathode and anode are in a flat sheet-like configuration having front and back surfaces and are disposed with the front surfaces in a spaced face to face position; and the electromagnet is a re-entrant one comprising a cylindrical yoke containing an electromagnetic coil and is positioned adjacent the back surface of the cathode.

15. An apparatus for use in an electric discharge laser comprising:
   a housing having an interior surface;
   an anode and a cathode disposed within said housing, said anode and cathode having means for connection to an electric power source and which establish therebetween an electric field and a glow discharge in a suitable gas when connected to the said source of electric power;

an electromagnet disposed within said housing having means for connection to a source of electric power and which establishes a profiled magnetic field across said electric field when connected to the said source of electric power; and an optical cavity means for extracting stimulated emission energy by the glow discharge.

16. The apparatus of claim 15 wherein the electromagnet produces a magnetic field having components in the same direction as and orthogonal to the electric field.

17. The apparatus of claim 16 wherein the cathode is a hollow cylinder, the anode is a coaxial hollow cylinder within and approximately the same length as the cathode, and the electromagnet is a coaxial hollow cylinder covering a substantial part of the exterior surface of the cathode.

18. The apparatus of claim 17 wherein each of the anode and cathode is of double walled construction and is adapted to receive a flow of cooling water between said double walls.

19. The apparatus of claim 16 wherein the cathode and anode are in a flat sheet-like configuration having front and back surfaces and are disposed with the front surfaces in a spaced face to face position; and the electromagnet is a re-entrant one comprising a cylindrical yoke containing an electromagnetic coil and is positioned adjacent the back surface of the cathode.

20. The apparatus of claim 19 wherein the cathode and anode are of double walled construction and are adapted to receive a flow of cooling water between said double walls.

21. The apparatus of claim 15 wherein the cathode and anode each comprises an elongated generally cylindrical coil, each turn of the coils being spaced from the adjacent turns, and wherein the two coils are coaxial and arranged with the anode coil within the cathode coil.

22. The apparatus of claim 17, or 21 wherein the said housing has spaced double walls forming a chamber therebetween and is adapted to be connected to a cooling water system for circulation of cooling water through said chamber.

23. The apparatus of claim 21 wherein the cathode coil also serves as an electromagnetic coil.

24. The apparatus of claim 23 wherein each of said coils is adapted to be connected to a cooling water supply and outlet system for circulation of cooling water through said coils.

25. The apparatus of claim 23 wherein the cathode coil is spaced from the interior surface of said housing.

26. The apparatus of claim 15 wherein the cathode and anode each comprises a flat coil, each turn of the coils being spaced from the adjacent turns, and wherein the two coils are arranged in a spaced apart face to face configuration.

27. The apparatus of claim 26 wherein the cathode coil also serves as an electromagnetic coil.

28. The apparatus of claim 27 wherein each of said coils is comprised of conductive metal tubing and is adapted to be connected to a system for circulating cooling water through said coils.

29. The apparatus of claim 26 wherein said coils are spaced from the interior surface of said housing.

30. An apparatus for use in an electric glow discharge laser comprising:
a housing;
a generally cylindrical gas containment vessel mounted within said housing and having an inner diameter;
a ring-shaped electrode mounted toward each end of said vessel, said electrodes having a diameter less than the inner diameter of said vessel and having means for connection to a source of electric power and which when connected to said source establish therebetween a glow discharge;
at least one three phase AC profiled magnetic field winding encircling said vessel; and
an optical cavity means for extracting stimulated emission energy produced by said glow discharge.

31. The apparatus of claim 30 wherein said vessel contains therein a tubular cylindrical cooling coil mounted intermediate said electrodes and having an inner diameter approximately equal to the diameter of said electrodes and an outer diameter less than the inner diameter of said vessel and wherein each turn of the oil is spaced from the adjacent turns.

32. The apparatus of claim 31 wherein said vessel and said cooling coil are of a nonconductive material.

33. The apparatus of claim 32 wherein said vessel is of glass and said cooling coil of glass or quartz.

34. The apparatus of claim 30 wherein said electrode rings are double walled and comprises means for connecting a cooling liquid circulation system for circulation of said liquid through said rings.

35. The apparatus of claim 30 wherein said vessel has spaced double walls forming a substantially annular chamber and is adapted to be connected to a cooling liquid circulation system for circulation of said liquid in the said annular chamber.

* * * * *